(12) United States Patent
Galvin

(10) Patent No.: US 11,058,124 B2
(45) Date of Patent: Jul. 13, 2021

(54) COMPOSITION AND METHOD OF MAKING OF PLANT-BASED, GLUTEN-FREE, SHELF-STABLE DOUGH

(71) Applicant: Love and Light Nourishing Foods, LLC, Yarmouth Port, MA (US)

(72) Inventor: Mary G. Galvin, Yarmouth Port, MA (US)

(73) Assignee: Love and Light Nourishing Foods, LLC, Yarmouth Port, MA (US)

( * ) Notice: Subject to any disclaimer, the term of this patent is extended or adjusted under 35 U.S.C. 154(b) by 283 days.

(21) Appl. No.: 15/896,043

(22) Filed: Feb. 13, 2018

(65) Prior Publication Data

US 2019/0246651 A1 Aug. 15, 2019

(51) Int. Cl.
*A21D 2/18* (2006.01)
*A21D 10/02* (2006.01)
A21D 13/066 (2017.01)

(52) U.S. Cl.
CPC ............ *A21D 2/181* (2013.01); *A21D 2/186* (2013.01); *A21D 10/025* (2013.01); *A21D 13/066* (2013.01)

(58) Field of Classification Search
CPC .................................................. A21D 10/025
See application file for complete search history.

(56) References Cited

U.S. PATENT DOCUMENTS

| | | | |
|---|---|---|---|
| 3,791,790 A * | 2/1974 | Wyndham ............... | C02F 1/325 210/251 |
| 6,827,965 B1 | 12/2004 | Fitzpatrick | |
| 2003/0003214 A1* | 1/2003 | Kraklow .............. | A21D 10/025 426/551 |
| 2004/0219272 A1* | 11/2004 | Kraklow ................ | A21D 13/04 426/549 |
| 2011/0045146 A1 | 2/2011 | Canty et al. | |
| 2013/0040016 A1 | 2/2013 | Becker | |
| 2014/0193565 A1 | 7/2014 | Ward et al. | |
| 2016/0120191 A1* | 5/2016 | Dacey ..................... | A21D 2/34 426/549 |

FOREIGN PATENT DOCUMENTS

| EP | 0 145 550 A2 | 6/1985 |
|---|---|---|
| WO | 2016/097328 A1 | 6/2016 |

OTHER PUBLICATIONS

"A Guide to Gum Free Binders in Gluten Free and Vegan Baking". Available online from Sep. 16, 2015 from www.willfrolicforfood.com. pp. 1-23. (Year: 2015).*
"Beetroot Coconut Sugar Cookies". Available online from Dec. 16, 2014 from https://nutritionstripped.com/beetroot-coconut-sugar-cookies/. pp. 1-16. (Year: 2014).*
"A Life Less Sweet: Because you asked . . . invert sugar". Available online as of May 28, 2009 from http://alifelesssweet.blogspot.com. pp. 1-17. (Year: 2009).*
[No Author Listed] Cookie Doh! Edible & Bakeable Gourmet Cookie Dough. Product description. Publication date is unknown. 13 Pages. Retrieved on Jun. 20, 2018 from <https://www.eatcookiedoh.com/>.
[No Author Listed] Decagon Devices, Fundamentals of Water Activity. Decagon Devices, Pullman, WA; 2006, 8 Pages.
[No Author Listed] Do, Cookie Dough Confections, Gourmet edible, bakeable, customizable cookie dough! Product description. Publication date is unknown. 19 Pages. Retrieved on Jun. 20, 2018 from <https://www.cookiedonyc.com/cookie-dough-confections/>.
[No Author Listed] Edoughble. Product description. Publication Date is Unknown. 24 Pages. Retrieved on Jun. 20, 2018 from <https://www.edoughble.com/>.
[No Author Listed] Food Code, U.S. Public Health Service, FDA, 2013. U.S. Department of Health and Human Services, College Park MD, 2013, 768 Pages.
[No Author Listed] Institute of Food Technologists. Evaluation and Definition of Potentially Hazardous Foods, A Report of the Institute of Food Technologists for the Food and Drug Administration of the United States Department of Health and Human Services. Dec. 31, 2001, 109 Pages. IFT/FDA Contract No. 223-98-2333, Task Order No. 4.

(Continued)

*Primary Examiner* — Jenna A Watts
(74) *Attorney, Agent, or Firm* — Nutter McClennen & Fish LLP

(57) ABSTRACT

The present disclosure is directed to compositions and methods of preparing a shelf-stable, plant-based, gluten-free dough (e.g., cookie dough) that can be stored in non-refrigerated conditions for a prolonged period without the need for time and/or temperature controls. Shelf stability is achieved based on the disclosure of compounds that have desired low moisture content and such that the dough, and methods of making the dough, regulate the water activity and pH to levels at which microbial growth is minimized or is otherwise prevented. The dough can use all-natural, organic, plant-based, and/or vegan ingredients to be devoid of preservatives and to be part of a healthy, balanced diet. Other aspects of the present disclosure, including various combinations of ingredients used and their relative proportions and ratios, and methods for combining the ingredients, are also provided.

33 Claims, No Drawings

(56) References Cited

OTHER PUBLICATIONS

[No Author Listed] Pine Valley Foods. Shelf Stable Cookie Dough*, Frozen but Friendly, Frequently Asked Questions. May 9, 2013, 1 Page. Retrieved on Jun. 20, 2018 from <http://cdn2.hubspot.net/hub/458100//file-2565130170-pdf/pine_valley/Document_PDFs/PV2319FrozenbutFriendlyFlyer.pdf>.

Blumenfeld, J., The Plant Revolution: Why Americans Are Turning Over a New Leaf and Growing the Plant-Based Movement. Delicious Living. Sep. 2017, pp. 29-35.

Burrington, K.J., Prolonging bakery product life. Natural Products Insider, Informa USA, Inc. Jun. 30, 1998, 10 Pages. Retrieved on Jun. 20, 2018 from <https://www.naturalproductsinsider.com/regulatory/prolonging-bakery-poduct-life>.

Hartman, L.R., Cookie market: Enjoying gluten-free treats. Snack Food & Wholesale Bakery, BNP Media. May 8, 2014, 7 Pages. Retrieved on Jun. 20, 2018 from <https://www.snackandbakery.com/articles/87167-cookie-market-enjoying-gluten-free-treats?>.

Leistner, L., Principles and applications of hurdler technology. In New Methods of Food Preservation, G.W. Gould, ed., Aspen Publishers, Inc., Gaithersburg, Maryland, USA, 1995, pp. 1-21.

Pourabedin, M., et al., Effect of flaxseed flour on rheological properties, staling and total phenol of Iranian toast. Journal of Cereal Science. Jul. 2017;76:173-178.

Price, M., Chocolate chip cookie dough truffles. Honest & Truly, Mediavine Publisher Network. Dec. 1, 2013, 10 Pages. Retrieved on Jun. 20, 2018 from <https://honestandtruly.com/dairy-free-chocolate-chip-cookie-dough-truffle-recipe/>.

Richman, A., Gluten-free gone mainstream: As gluten-free marken demand soars, suppliers and manufacturers scramble to fill store shelves. Nutraceuticals World, Rodman Media. May 1, 2013, 5 Pages. Retrieved on Jun. 20, 2018 from <http://www.nutraceuticalsworld.com/issues/2013-05/view_features/gluten-free-gone-mainstream/>.

Rosell, C.M., et al., Market and Nutrition Issues of Gluten-Free Foodstuff. In Advances in the Understanding of Gluten Related Pathology and the Evolution of Gluten-Free Foods. Arranz, E., et al., eds., OmniaScience, Barcelona, Spain, 2015, Chapter 20, pp. 675-713.

Shim, Y. Y., et al., Secoisolariciresinol Diglucoside and Cyanogenic Glycosides in Gluten-free Bread Fortified with Flaxseed Meal. Journal of Agricultural and Food Chemistry. Nov. 27, 2016;64(50):9551-9558.

Šimurina, O, et al., Application of response surface methodology in the development of specialty bread with sugar beet molasses, flax seed and vital wheat gluten. Food and Feed Research. 2012;39(1):11-21.

Vadukapuram, N., et al., Physicochemical Properties of Flaxseed Fortified Extruded Bean Snack. International Journal of Food Science, Hindawi Publishing Corp. Sep. 30, 2014, vol. 2014, Article ID 478018, 8 Pages.

* cited by examiner

COMPOSITION AND METHOD OF MAKING OF PLANT-BASED, GLUTEN-FREE, SHELF-STABLE DOUGH

FIELD

The present disclosure relates to a composition and a method of making a shelf-stable dough (e.g., cookie dough), and more particularly relates to a dough that can be stored in non-refrigerated conditions for a prolonged period without the need for time and/or temperature controls to help prevent contamination and/or spoliation.

BACKGROUND

Food quality and safety standards have become more heavily scrutinized by the global marketplace in recent years. Many countries and private enterprises have invested large sums of money into studying the health benefits of certain foods and food groups for human consumption. Various studies have assessed the potential negative impacts that pesticides, preservatives, and other foreign substances that are often added to foods have on the human body. The prevalence of these scientific inquiries have raised consumer consciousness about the source of the foods they consume and the importance of maintaining a healthy and balanced diet. Further, as the prevalence of scientific testing methods has increased, the accuracy of detection of allergens in foods has led people to try and find suitable alternatives in an effort to continue to consume essential nutrients. Studies have shown that consumption of all-natural foods can assist with weight loss, prolong lifespan, and improve overall health. As a result, consumer preference for all-natural and/or organic foods has increased, which has altered food production methods and consumption patterns worldwide. Likewise, consumers and companies have shown an increasing interest in plant-based foods, particularly if the resulting foods can be equal in taste to the non-plant-based alternatives that have traditionally been more common.

While some foods have a large variety of all-natural and organic options, others lack viable alternatives. Doughs, used for making breads and various dessert items, such as cookies, often lack all-natural, healthy variants. Doughs are often high in carbohydrates and fats. Further, existing doughs can contain eggs, butter, gelatin, and other substances that, even in trace amounts, can cause allergic reactions and/or are not able to be consumed by individuals having particular dietary restrictions, e.g., vegans, vegetarians, those who are lactose intolerant, and/or those who are gluten-intolerant, among others. The lack of viable alternatives has made it difficult for individuals to maintain these diets and has created an obstacle that dissuades others from attempting to follow these diets because of an unwillingness or an inability to cut out entire food groups from their daily intake. To the extent people do modify their diets, there appears to be a prevalent opinion in society that foods tailored to be safe for consumption by people with particular dietary restrictions lacks the same quality in taste as like foods that are made with more common recipes that incorporate the ingredients that cause the various intolerances and the like (e.g., ingredients with gluten, milk, eggs, etc.).

Another issue that can plague existing doughs is spoliation. The presence of eggs, dairy, and other ingredients that are prone to expiration are commonly found in doughs, which lends it to possible contamination that can cause food-borne illnesses. Insufficient refrigeration, either during shipping or during storage in the market or at home, can result in spoliation of the dough and/or promote growth of yeast or bacteria, e.g., *E. coli*. This can be particularly problematic for items like cookie dough, which many consumers may eat raw. Cookie dough that includes ingredients prone to expiration is more likely to cause *salmonellosis* or other digestive problems when consumed than cookie dough that does not contain those ingredients. Beyond the risk of sickness and disease, power loss or failure, and/or an inability to store food in a refrigerated setting, can lead to undesirable loss of food that require refrigeration to avoid spoliation and the like. Further, storage space in a refrigerated setting can often be more sparse than storage space at ambient or room temperature, thus limiting the amount of food that can be stored in a refrigerated setting.

While some existing doughs claim to use all-natural ingredients and to be shelf stable, e.g., DOH from One Green Planet, many of them use eggs or gelatin, which are prone to spoliation, or require refrigeration and/or shipping in ice packed containers. By using all-natural ingredients that do not spoil and do not require refrigeration, costs of shipping and storage can be reduced, which has the potential to allow the cost of dough for the average consumer to decrease. Further, the shelf stability of the dough at non-refrigerated conditions can allow it to be shipped to, and safely consumed in, areas that lack appropriate resources for refrigeration and do not have strict food handling best practices in place.

Accordingly, there is a need for an all-natural, plant-based, shelf-stable dough that can be shipped and stored at non-refrigerated conditions. Further, it would be beneficial if such a dough can be shelf stable at ambient temperatures for extended periods without the need for time and/or temperature controls.

SUMMARY

The compositions, sometimes referred to as compositions of matter or compounds, and methods provided for in the present disclosure are directed to dough, and a method of making a dough, that can be stored in non-refrigerated conditions for a prolonged period without the need for time and/or temperature controls to help prevent contamination and/or spoliation. The disclosure presented herein can be followed to prepare an all-natural, plant-based dough composition that can be made into cookies, pies, cake, bread, among other baked goods, though it will be appreciated that, in some embodiments, the dough can be consumed without being baked, e.g., raw. The dough is shelf-stable and can be stored in non-refrigerated conditions once prepared for an extended period of time without risk of contamination or spoliation when viewed against the standards that regulate these types of measurements.

One exemplary method of preparing a shelf-stable dough, includes combining flaxseed meal and purified water. The amount of flaxseed meal is from about 0.5% by weight to about 1.5% by weight, and the purified water is from about 4% by weight to about 9% by weight. The flaxseed meal is allowed to reconstitute with the purified water for between about five (5) minutes to about fifteen (15) minutes, which results in the formation of diluted flaxseed (also referred to as a dilution herein). A shortening-sugar compound is formed by combining from about 7% by weight to about 9% by weight of cane sugar, from about 14% by weight to about 18% by weight of coconut sugar, and from about 15% by weight to about 20% by weight of shortening. The diluted flaxseed is mixed with the shortening-sugar compound to form a diluted flaxseed-shortening-sugar compound. A flour blend is added to the diluted flaxseed-shortening-sugar compound. More specifically, the flour blend that is added is from about 30% by weight to about 35% by weight. All of the percentages provided are based on the total weight of the dough. Further, the dough has a water activity of less than or equal to about 0.83.

The flour blend can be prepared by mixing from about 55% by weight to about 60% by weight of white rice flour relative to the weight of the flour blend, and from about 20% by weight to about 25% by weight of tapioca flour relative to the weight of the flour blend, with from about 18% by weight to about 22% weight by weight of potato starch relative to the weight of the flour blend. In some such embodiments, the flour blend can also include from about 0.8% by weight to about 1.4% by weight of xanthan gum relative to the weight of the flour blend. The flour blend can be added to the diluted flaxseed during mixing of the diluted flaxseed with the shortening-sugar compound to form the diluted flaxseed-shortening-sugar compound.

In some embodiments, allowing the flaxseed meal to reconstitute with the purified water from between about five (5) minutes to about fifteen (15) minutes can include allowing the flaxseed meal to reconstitute with the purified water for about 10 minutes to about 15 minutes. The action of mixing the diluted flaxseed and the shortening-sugar compound can occur approximately in the range of about ten (10) minutes to about fifteen (15) minutes after the flaxseed meal has been reconstitute with the purified water for between about five (5) minutes to about fifteen (15) minutes to form diluted flaxseed.

One or more flavoring ingredients can be added to the dough. In some such embodiments, the flavoring ingredients can include one or more of a chocolate chip (or equivalents thereof) and a cranberry (or equivalents thereof). Alternatively, or additionally, a flavoring ingredient(s) can include vanilla. In such embodiments, the vanilla can be mixed in approximately at the same time the diluted flaxseed and the shortening-sugar compound are mixed to form the diluted flaxseed-shortening-sugar compound.

In some embodiments, combining from about 7% by weight to about 9% by weight of cane sugar, from about 14% by weight to about 18% by weight of coconut sugar, and about 15% by weight to about 20% by weight of shortening to form a shortening-sugar compound can include creaming from about 7% by weight to about 9% by weight of cane sugar, from about 14% by weight to about 18% by weight of coconut sugar, and about 15% by weight to about 20% by weight of shortening to form the shortening-sugar compound. The creaming can be performed with at least one of a whisk, a paddle, and an electric mixer.

Each of the flaxseed meal, the cane sugar, the coconut sugar, the shortening, and the flour blend can be plant-based and/or gluten-free and/or allergen-free. The dough that results from the methods provided can have a pH approximately in the range of about 7 to about 8.1 at ambient temperature. The water activity of the dough can be less than or equal to about 0.83 at ambient temperature for at least about 30 days. In some embodiments, the water activity of the dough can be less than or equal to about 0.83 at ambient temperature for at least about 60 days.

In some embodiments, the method can also include packaging the dough. For example, the method can include depositing the dough into a packing container and sealing the container such that the container is substantially devoid of air.

One exemplary embodiment a shelf-stable dough includes a flour mix, a flaxseed meal, distilled water, and sugar. More particularly, the dough includes from about 30% by weight to about 35% by weight of a flour mix, from about 0.5% by weight to about 1.5% by weight of a flaxseed meal, from about 4% by weight to about 9% by weight of distilled water, and from about 21% to about 27% by weight of sugar. The percentages are based on the total weight of the dough. Further, the flour mix includes from about 55% by weight to about 60% by weight of white rice flour relative to the total weight of the flour mix, from about 20% by weight to about 25% by weight of tapioca flour relative to the total weight of the flour mix, and from about 18% by weight to about 22% by weight of potato starch relative to the total weight of the flour mix. Still further, a water activity of the dough is less than or equal to about 0.83.

In some embodiments, a ratio of the tapioca flour to the white rice flour can be approximately in the range of about 1:2.4 to about 1:3. Alternatively, or additionally, a ratio of the potato starch to the white rice flour can be approximately in the range of about 1:2.4 to about 1:3. Further alternatively, or additionally, a ratio of the potato starch to the tapioca flour can be approximately in the range of about 0.75:1 to about 1.5:1. The flour mix can also include xanthan gum. A ratio of the xanthan gum to the white rice flour can be approximately in the range of about 1:50 to about 1:60.

The flour mix can include a shortening that is approximately in the range of about 15% by weight to about 20% by weight. The shortening can include a coconut oil and/or a palm oil.

A ratio of the flaxseed meal to the distilled water can be approximately in the range of about 1 tablespoon of flaxseed meal to about 2½ tablespoons of distilled water to about 1 tablespoon of flaxseed meal to about 3½ tablespoons of distilled water. In some embodiments, the flaxseed meal and the distilled water used in the dough can have been mixed and undistributed for about five (5) minutes to about fifteen (15) minutes for flaxseed rehydration.

Each of the flour mix, the flaxseed meal, and the sugar can be plant-based and/or gluten-free and/or allergen-free. The dough can have a pH approximately in the range of about 7 to about 8.1 at ambient temperature. The water activity of the dough can be less than or equal to about 0.83 at ambient temperature for at least about 30 days. In some embodiments, the water activity of the dough can be less than or equal to about 0.83 at ambient temperature for at least about 60 days.

An exemplary embodiment a shelf-stable cookie dough includes a flour mix, a fiber-based product, distilled water, and sugar, with the flour mix including white rice flour, tapioca flour, and potato starch. The dough is plant-based, non-GMO, and gluten-free, and has a water activity of less than or equal to about 0.83.

In some embodiments, a ratio of the tapioca flour to the white rice flour can be approximately in the range of about 1:2.4 to about 1:3. Alternatively, or additionally, a ratio of the potato starch to the white rice flour can be approximately in the range of about 1:2.4 to about 1:3. Further alternatively, or additionally, a ratio of the potato starch to the tapioca flour can be approximately in the range of about 0.75:1 to about 1.5:1. The flour mix can also include xanthan gum. A ratio of the xanthan gum to the white rice flour can be approximately in the range of about 1:50 to about 1:60.

The flour mix can also include shortening. Further, the shortening can include at least one of a coconut oil and a palm oil. The fiber-based product can include organic flaxseed meal.

Each of the flour mix, the fiber-based product, and the sugar can be plant-based and/or gluten-free and/or allergen-free. The dough can have a pH approximately in the range of about 7 to about 8.1 at ambient temperature. The water activity of the dough can be less than or equal to about 0.83 at ambient temperature for at least about 30 days. In some embodiments, the water activity of the dough can be less than or equal to about 0.83 at ambient temperature for at least about 60 days.

DETAILED DESCRIPTION

Certain exemplary embodiments will now be described to provide an overall understanding of the compositions of matter (e.g., the dough), and methods of making the same. The present disclosure provides for various ingredients, and/or combinations thereof, to formulate the compositions of matter, and further provides for various steps that can be used to combine the various ingredients, and/or combinations thereof, to arrive at the compositions of matter. Those skilled in the art will understand that the compositions and methods described herein are non-limiting exemplary embodiments and that the scope of the present disclosure is defined solely by the claims. The features illustrated or described in connection with one exemplary embodiment may typically be combined with the features of other embodiments, unless indicated otherwise. For example, a person skilled in the art, in view of the present disclosure, will understand one or more steps that are provided as part of one method for making compositions of matter as provided for herein that can be used in other methods for making compositions of matter as provided for herein or otherwise known in the art. Likewise, a person skilled in the art will understand various steps that can be interchangeable between various methods disclosed herein or otherwise known to those skilled in the art, or otherwise modified in view of various methods disclosed herein or otherwise known to those skilled in the art, without departing from the spirit of the present disclosure. By way of non-limiting example, a person skilled in the art, in view of the present disclosure, will understand other methods for mixing ingredients such as sugar and shortening than by creaming even though creaming is one of the techniques disclosed herein. The use of alternative techniques, whether explicitly disclosed in the present application or known by those skilled in the art in view of the present disclosure, typically still maintains the inventive concepts associated with the present disclosure.

In a similar vein, a person skilled in the art, in view of the present disclosure, will understand one or more ingredients, mixtures, compounds, etc. that are provided as part of one of the disclosed compositions of matter (e.g., dough) herein that can be used in other compositions of matter (e.g., dough) as provided for herein or otherwise known in the art. Likewise, a person skilled in the art will understand various ingredients, mixtures, compounds, etc. that can be interchangeable between various compositions disclosed herein or otherwise known to those skilled in the art, or otherwise modified in view of various compositions disclosed herein or otherwise known to those skilled in the art, without departing from the spirit of the present disclosure. By way of non-limiting example, a person skilled in the art, in view of the present disclosure, will understand other ingredients that may be able to be substituted for sugar as provided for herein while still maintaining the inventive concepts associated with the present disclosure. The use of alternative ingredients, mixtures, compounds, etc., whether explicitly disclosed in the present application or known by those skilled in the art in view of the present disclosure, typically still maintains the inventive concepts associated with the present disclosure. Such modifications and variations of the methods and compositions of matter are intended to be included within the scope of the present disclosure. Of course, a person skilled in the art, in view of the present disclosure, will understand the critical nature of some of the ingredients, mixtures, compounds, etc., including the amounts of such materials, and thus, in view of the present disclosure, some of those materials and amounts cannot be easily substituted while still achieving the goals of providing an all-natural, plant-based, shelf-stable dough.

In the present disclosure, a number of different terms can be used interchangeably while still being understood by the skilled person. By way of non-limiting example, the terms "ingredients" and "substances" (and other words generally known to those skilled in the art as suitable substitutes for a term like "ingredients") can generally be used interchangeably to describe the materials used to form the compounds that result in the dough composition. By way of still further non-limiting example, terms such as "microbial" and "contaminant" are generally used to describe cells, bacteria, mold, yeast, and other foreign materials that can grow in food products such as dough. By way of yet another non-limiting example, the terms "flour mix" and "flour blend" are generally used to describe the amalgamation of flours used in making the dough compositions provided for herein. By way of a further non-limiting example, the terms "reconstitute" and "rehydrate" are generally used to describe the interaction of a flaxseed meal and water in which water is absorbed by the flaxseed meal to reconstitute the flaxseed meal, in turn lowering the moisture content of the resultant dough composition. Still further, in instances where one ingredient, mixture, compound, etc., is used to describe preparing the composition of matter, a person skilled in the art, in view of the present disclosure, will understand other ingredients, mixtures, compounds, etc. that can be used in lieu of, or in addition to, the ingredient, mixture, compound, etc. that is used in the description. By way of non-limiting example, in instances where a flaxseed meal is discussed, in view of the present disclosure, a person skilled in the art will understand other fiber-based compounds or other ingredients that can serve as an egg substitute may be used in lieu of, or in addition to, the flaxseed meal without departing from the spirit of the present disclosure. Likewise, in the present disclosure, a combination of ingredients is sometimes referred to using one or more terms in combination. A person skilled in the art, in view of the present disclosure, will understand other combinations of terms/ingredients that can be used without departing from the spirit of the present disclosure. Accordingly, just because a combination of a diluted flaxseed and a shortening-sugar compound is sometimes referred to as a diluted flaxseed-shortening-sugar compound, other combinations of terms (e.g., a dilution-shortening-sweetening compound) can also be used.

A person skilled in the art will recognize how to rely upon the present disclosure to integrate the techniques and methods provided for into a product in view of the present disclosure. For example, the present disclosure provides for the formulation of various doughs (e.g., cookie doughs), and a person skilled in the art will recognize that in some instances, the doughs themselves can be packaged for subsequent distribution, sale, and/or use (e.g., baking the dough), while in other instances the dough can be baked and the resultant food product (e.g., cookies) may be distributed, sold, and/or used (e.g., eaten).

The present disclosure relates to compositions and methods of making a shelf-stable, plant-based dough, and more particularly relates to an all-natural dough that can be stored in non-refrigerated conditions for a prolonged period (e.g., at least up to 30 days, at least up to 60 days, at least up to 70 days, at least up to 74 days) without the need for time and/or temperature controls to prevent undesired levels of contamination and/or spoliation. The dough can be made from all-natural, gluten-free, plant-based, vegan, allergen-free, and/or organic ingredients that, when mixed in the amounts specified herein, prolong shelf-life and do not foster an environment that is conducive to microbial growth. The dough, as described herein, pertains to cookie dough, though it will be appreciated that a person skilled in the art, in view of the present disclosure, will be able to modify and/or adapt the techniques and compositions provided for herein to make other compositions of matter, such as doughs used to make other types of food, such as pie, bread, cake, etc. A person skilled in the art, in view of the present disclosures, for example, would understand additional moisture would be needed to produce some of these doughs, such as for bread and cake. The present disclosures are particularly applicable to pie dough as well.

Use of ingredients in the proportions described herein can regulate water activity and prevent microbial growth. The interactions between the ingredients used in making the dough can minimize moisture content and maintain desired pH levels that inhibit microbial growth and can make this product shelf-stable (i.e., able to be stored at ambient or room temperature without the need for time and/or temperature controls to prevent undesired levels of contamination and/or spoliation). An exemplary composition can include a flour blend having a mixture of flours and starches that, like the remainder of the ingredients in the dough, are plant-based, gluten-free, vegan, and allergen-free. The flour can include one or more of a white rice flour, a tapioca flour, and/or a potato starch. The ingredients of the flour blend can interact with one another to absorb water and maintain a low moisture content. The relative proportions of the ingredients in the flour mix can aid in water absorption to regulate pH levels in the dough. Water activity and pH can be also be regulated by adding a fiber-based compound to the dough. The fiber-based compound can include a flaxseed meal that can be mixed with water (e.g., distilled water) to act as a binder for the dough.

One or more of the ingredients described above are part of the ingredients used in the dough composition herein. The exemplary composition can have additional ingredients that may contribute to regulation of pH and water activity of the dough. The additional ingredients, as described further below, can include a shortening, flavoring ingredients, and sugar, among others. The shortening, by way of non-limiting example, can include antibacterial, antifungal, and antiviral properties that interact with the dough to bring beneficial results. More particularly, some shortenings can include coconut oil to aid in providing the antibacterial, antifungal, and antiviral properties. The flaxseed meal and water dilution can be added to the remaining ingredients and incorporated to form a mixture of compound identified herein as a diluted flaxseed. The flour blend can be added and incorporated to the diluted flaxseed to form the dough composition. The resultant dough composition can be packaged and stored in non-refrigerated conditions. One having ordinary skill in the art will appreciate that refrigeration of the dough described herein may enhance shelf-life and prolong reduced water and microbial activity, though it is not required for shelf-stability.

A person skilled in the art will recognize that shelf-stability can be impacted by the water activity and/or pH level of the composition of matter. The Food and Drug Administration (FDA) Food Code and the Institute of Food Technologists (IFT) Review of Potentially Hazardous Foods definitions identify a water activity level of less than 0.88 as the level of activity to allow for safe storage without temperature control. Further, a water activity level of about 0.85 or less typically prevents the growth and toxin production of all pathogenic bacteria, including *S. aureus* and *C. botulinum*, and thus can be important for the safety of a shelf-stable product based on water activity. The present disclosures generally allow for water activity to be about 0.85 or less, and typically less than or equal to about 0.83. One having ordinary skill in the art will recognize that for food that is not heat treated, water activity levels in this range can support any pH without temperature control for food safety. Water activity levels of 0.88 or higher should be supported by acidity to maintain food safety without temperature controls. As illustrated below, a pH level approximately in the range of about 7 to about 8.1 resulted in testing associated with some of the embodiments provided for herein, and thus the present disclosure supports a shelf-stable product that has a pH level in that range. A person skilled in the art will recognize other pH levels may also be possible in shelf-stable products, at least because of the previous indication that foot that is not heat treated can support any pH level without temperature control provided the water activity levels are at the desired values.

Dough Composition

One, non-limiting exemplary embodiment of the dough is described further below. One ingredient that can be included in the dough is one or more fiber-based compounds. As discussed herein, fiber-based compounds can be used as a form of binder in instances in which an egg replacer and/or substitute is desired, such as in vegan cooking. The fiber-based compound can include, by way of non-limiting example, a flaxseed meal (e.g., Bob's Red Mill Organic Golden Flaxseed Meal, Now Real Food Certified Organic Flax Seed Meal, among others). One having ordinary skill in the art will appreciate that in some embodiments, the dough can include other fiber-based compounds, such as flaxseeds, chia, and/or *psyllium*, in lieu of or in addition to the flaxseed meal, so that the fiber-based compound(s) can function as a binder for the dough.

As provided for herein, the flaxseed meal, and/or other fiber-based compound(s), can regulate water activity and control the viscosity of the dough. Further, the flaxseed meal, and/or other fiber-based compound(s), can regulate water activity by decreasing the moisture content of the dough. When mixed with water (e.g., distilled and/or purified water), the flaxseed meal and water can form a dilution, also referred to herein as diluted flaxseed (or diluted fiber-based compound or product as appropriate). In the dilution, the flaxseed meal can be set aside to reconstitute and absorb the water. The dilution can be added to the remaining ingredients and incorporated therein. Once incorporated, the flaxseed meal can continue to absorb water from the dilution and the remaining ingredients to further lower moisture content.

In some embodiments, the flaxseed meal can be used in an amount approximately in the range of about 0.5% by weight to about 1.5% by weight, or approximately in the range of about 0.75% by weight to about 1.25% by weight, or approximately in the range of about 0.8% by weight to about 1.1% by weight, or approximately in the range of about 0.9% by weight to about 1.05% by weight, or approximately in the range of about 0.99% by weight to about 1.01% by weight, based on the total weight of the dough. Flaxseed meal in these ranges, when combined with water, can mimic a consistency of an egg typically used in making dough.

Water (e.g., distilled and/or purified) can be added to the dough to hydrate the ingredients. The use of distilled and/or purified water in particular can be more easily absorbed by the flour (described further below) and is generally free of contaminants. As used herein, distilled water encompasses purified water, and likewise, purified water encompasses distilled water. In some instances, the distilled and/or purified water can be combined with baking soda to increase alkalinity of the overall product. For example, one teaspoon of baking soda to one gallon of distilled water can make the water highly alkaline with a pH of about 8.0. A person preparing the doughs provided herein may be interested in increasing the alkaline of the water because higher alkalinity can inhibit bacterial and fungal growth, and may also have anti-viral properties. In some exemplary embodiments, distilled and/or purified water (e.g., Just the Basics Purified Water) can be used, though other forms of water, e.g., filtered, tap, etc. can also be used. Water can be mixed with the flaxseed meal to hydrate the flaxseed meal to an egg-like consistency, though it will be appreciated that water can also be added to one or more of the remaining ingredients, and/or to the dough, to change its consistency. When water is added to the flaxseed meal, the dilution can form a gel that, when incorporated into the dough, can help bind the dough composition.

The water and flaxseed meal dilution can have varying consistencies. Gels that are too thick can inadequately hydrate the flaxseed, making the dilution too dry, which can adversely affect the taste of the dough as well as the color and ability to consume the product as a dough (i.e., both raw and baked). Gels that are too thin can have insufficient amounts of flaxseed to absorb the water contained in the dilution. Unabsorbed water can cause the dilution to be runny and introduce excess moisture into the dough when the dilution is incorporated therein, as described further below. Excess moisture can increase microbial activity in the dough and reduce the pH, which can adversely impact the shelf stability of the dough composition.

The consistency of the gel in the dilution can vary based on the relative amounts of the water and the flaxseed meal in the dilution. One having ordinary skill in the art will appreciate that in vegan and plant-based cooking, ratios of about 1 tablespoon (7 grams) of flaxseed meal to about 3 tablespoons (45 milliliters) of water can be equal to about one egg. In some embodiments, water and flaxseed are mixed until a gel having a desired consistency is obtained. A desired consistency of the gel can be such that it includes a thick center with a regular yellow halo and a regular white border for a reconstituted dilution, though the appearance of the gel can vary across embodiments. For example, in some embodiments, gels having scant or thin yellow halos or an irregular border can be used to make the dough composition of the present disclosure.

The present disclosure provides that a ratio approximately in the range of about 1 tablespoon of flaxseed meal to about 2½ tablespoons of water to about 1 tablespoon of flaxseed meal to about 3½ tablespoons of water can yield a gel of the desired consistency. In some embodiments, the ratio can be approximately in the range of about 1 tablespoon of flaxseed meal to about 2⅔ tablespoons of water to about 1 tablespoon of flaxseed meal to about 3⅓ tablespoons of water, or approximately in the range of about 1 tablespoon of flaxseed meal to about 2⅚ tablespoons of water to about 1 tablespoon of flaxseed meal to about 3¼ tablespoons of water, or about 1 tablespoon of flaxseed meal to about 3 tablespoons of water to yield a gel of the desired consistency. Thus, the amount of water added to the flaxseed meal can be approximately in the range of about 4% by weight to about 9% by weight, or approximately in the range of about 4.5% by weight to about 7.5% by weight, or approximately in the range of about 5% by weight to about 7% by weight, or approximately in the range of about 5.5% by weight to about 6.5% by weight, or approximately in the range of about 5.75% by weight to about 6.25% by weight, based on the total weight of the dough.

It will be appreciated that dilutions with ratios of water to flaxseed in the above ranges, as well as dilutions having water to flaxseed ratios that deviate from the above ranges, can produce gels of varying thicknesses, halos having different shades of yellow, and borders having both regular and irregular shapes. The appearance of the gel can be used to confirm that the proper ratios of ingredients are being used, but gels having an atypical appearance, e.g., color, shape, and/or consistency, can nevertheless be used to make the dough of the present disclosure.

Once prepared, the dilution can be set aside to stand to allow the flaxseed to soak in or otherwise absorb the water. Setting aside the dilution can allow the water to rehydrate the flaxseed to bring the dilution to the desired consistency. When set aside, the dilution can remain undisturbed, though, in some embodiments, the dilution can be occasionally stirred to facilitate water absorption. When set aside, water bonds to the flaxseed in the dilution to limit the amount of water in the dilution and reduce water activity. It will be appreciated that a dilution deviates from the desired appearance, e.g., too thick, has an irregular or thin border, and/or a scant yellow halo can suggest that the dilution has yet to reach the desired consistency.

The dilution can be set aside for about 5 minutes, for about 10 minutes, for about 15 minutes, or for more than 15 minutes. One having ordinary skill in the art will appreciate that consistency of the gel can increase with time. In some embodiments, the thickest gel consistency was reached in between about 10 minutes and about 15 minutes. In some embodiments, no discernable change in consistency was detected after the dilution was set aside for more than 15 minutes, though this can vary across embodiments.

The dough can include a flour blend. The flour blend can impact water absorption and regulate water activity and pH of the resultant dough. In one exemplary embodiment described herein, a flour blend can be incorporated into the dough to provide structure to the dough, as well as nutrients and fiber, and to contribute to its taste, color, and consistency.

An amount of flour blend can be used in an amount approximately in the range of about 30% by weight to about 35% by weight, or approximately in the range of about 31% by weight to about 34% by weight, or approximately in the range of about 32% by weight to about 33% by weight, or approximately in the range of about 32.34% by weight to about 32.81% by weight, based on the total weight of the dough.

The flour blend can include one or more ingredients that provides the basic structure that holds those ingredients together. In the exemplary embodiment, the flour blend can include a white rice flour, a tapioca flour, a potato starch, and a xanthan gum. It will be appreciated that in some embodiments, additional ingredients (e.g., sea salt, baking soda, baking powder) can be added to the flour blend to facilitate rising of the dough. The flours can also absorb moisture to regulate pH and water activity levels to control microbial activity and extend the shelf-life of the resultant dough.

Including each of white rice flour, tapioca flour, and potato starch can produce a flour blend that closely replicates regular All-Purpose flour in color, consistency, and workability, which can provide the dough with a familiar texture for the baker or other person preparing the dough for use and/or consumption.

An amount of each of the ingredients in the flour blend can impact the dough product and the foods made therefrom. An exemplary embodiment can include Bob's Red Mill White Rice Flour, though it will be appreciated that in some embodiments, Gulf Pacific Gluten Free White Rice Flour, or other brands of white rice flour, can be used (separately or in conjunction with each other). The white rice flour can be used in an amount approximately in the range of about 55% by weight to about 60% by weight, or approximately in the range of about 55% by weight to about 58% by weight, or approximately in the range of about 56% by weight to about 57% by weight, or approximately in the range of about 56.2% by weight to about 56.5% by weight, or at about 56.33% by weight, based on the total weight of the flour blend.

Some exemplary embodiments of the flour blend can include Anthony's Organic Tapioca Flour, though it will be appreciated that in some embodiments, Bob's Red Mill Finely Ground Tapioca Flour, Arrowhead Mills Tapioca Flour, or other brands of tapioca flour can be used (separately or in conjunction with each other). The tapioca flour can be used in an amount of approximately in the range of about 20% by weight to about 25% by weight, or approximately in the range of about 20.5% by weight to about 23% by weight, or approximately in the range of about 20.75% by weight to about 22.25% by weight, or approximately in the range of about 21% by weight to about 22% by weight, or at about 21.5% by weight, based on the total weight of the flour blend.

Some exemplary embodiments of the flour blend can include Anthony's Organic Potato Starch, though it will be appreciated that in some embodiments, Bob's Red Mill Potato Starch, Frontier Natural Products Potato Starch, or other brands of potato starch can be used (separately or in conjunction with each other). The potato starch can be used in an amount of approximately in the range of about 18% by weight to about 22% by weight, or approximately in the range of about 19% by weight to about 21% by weight, or approximately in the range of about 19.5% by weight to about 20.5% by weight, or at about 20% by weight, based on the total weight of the flour blend.

Some exemplary embodiments of the flour blend can include "Gluten Free You and Me" Xanthan Gum, though it will be appreciated that in some embodiments, Bob's Red Mill Xanthan Gum, Now Healthy Foods Xanthan Gum, or other brands of xanthan gum can be used (separately or in conjunction with each other). Xanthan gum can serve as a protein binder and/or a gluten replacement that can hold the dough together. The xanthan gum can be used in an amount of approximately in the range of about 0.8% by weight to about 1.4% by weight, or approximately in the range of about 0.9% by weight to about 1.3% by weight, or approximately in the range of about 0.95% by weight to about 1.1% by weight, or at about 1% by weight, based on the total weight of the flour blend. Xanthan gum in the above ranges can prevent the flour blend from becoming gummy.

Relative ratios of the ingredients in the flour blend can also impact the properties of the dough product. A ratio of the tapioca to the white rice flour in the flour blend can be approximately in the range of about 1:2.4 to about 1:3, or approximately in the range of about 1:2.5 to about 1:2.8, or approximately in the range of about 1:2.6 to about 1:2.7. A ratio of the potato starch to the white rice flour can be approximately in the range of about 1:2.4 to about 1:3, or approximately in the range of about 1:2.5 to about 1:2.8, or approximately in the range of about 1:2.6 to about 1:2.7. A ratio of the potato starch to the tapioca flour can be approximately in the range of about 0.75:1 to about 1.5:1, or approximately in the range of about 0.9:1 to about 1.3:1; or approximately in the range of about 0.92:1 to about 1:1.

Further, a ratio of the xanthan gum to the white rice flour can be approximately in the range of about 1:50 to about 1:60, or approximately in the range of about 1:52 to about 1:58, or approximately in the range of about 1:53 to about 1:55, or at about 1:53.33. A ratio of the xanthan gum to the tapioca flour can be approximately in the range of about 1:18 to about 1:22, or approximately in the range of about 1:19 to about 1:21, or approximately in the range of about 1:20 to about 1:20.5, or at about 1:20.33. A ratio of the xanthan gum to the potato starch can be approximately in the range of about 1:16 to about 1:22, or approximately in the range of about 1:17 to about 1:21, or approximately in the range of about 1:18 to about 1:20, or at about 1:19.

In one non-limiting example of a flour mix that can be used in conjunction with the present disclosures, the mix includes white rice flour, tapioca flour, potato starch, xanthan gum, and seal salt, with each of the ingredients being certified organic, gluten-free, and non-genetically-modified organisms (GMO). The proportions can be about 960 grams of Bob's Red Mill White Rice Flour, about 366 grams of Anthony's Organic Tapioca Flour, about 342 grams of Anthony's Organic Potato Starch, about 18 grams of "Gluten Free You and Me" Xanthan Gum, and about 18 grams of bulk seat salt. In another non-limiting example of a flour mix that can be used in conjunction with the present disclosures, this mix being more of a bulk mix, the mix again includes white rice flour, tapioca flour, potato starch, xanthan gum, and seal salt. Again, each of the ingredients is certified organic, gluten-free, and non-GMO. The proportions can be about 25 pounds of white rice flour, 10 pounds of tapioca flour, about 6.4 pounds of potato starch, about 8 ounces of xanthan gum, and about four ounces of bulk sea salt. From the bulk flour, about 228 grams can be used for a single recipe to yield about 1.62 pounds of dough. A person skilled in the art will recognize the amount of flour mix made, and used for a single recipe, can vary depending on a variety of factors, including but not limited to the size limitations of the equipment being used and the preferences of the baker, among other factors. This is true for any of the ingredients, or mixtures thereof, provided for in the present disclosures.

The dough can include a shortening additive. The shortening can have antimicrobial (e.g., antibacterial, antifungal, antiviral) properties that can preserve the dough to increase its shelf-stability, help regulate microbial activity, and/or prevent growth of yeast and mold. The shortening can also prevent spoilage and maintains the flavor of the dough. More particularly, the shortening can include coconut oil to aid in providing the antibacterial, antifungal, and antiviral properties of the shortening, and thus the dough. The shortening can be solid at room temperature so as to provide firmness to the dough which can enhance its ability to be cut and/or separated. The shortening typically may be organic, though use of a non-organic shortening may be possible. One having ordinary skill in the art will appreciate that the shortening can melt or become pourable at elevated temperatures approximately in the range of about 85° F. to about 110° F., and/or at temperatures used for baking. A shortening blend, as opposed to just using an oil (e.g., coconut oil), can sometimes be preferred because it may be more stable in higher temperature ranges.

The shortening can include coconut oil, palm oil, peanut oil, and/or soybean oil. In some embodiments, a blend of two or more oils, such as Nutiva, which is a coconut oil/palm oil blend, can be used. An amount of shortening can be used in an amount approximately in the range of about 15% by weight to about 20% by weight, or approximately in the range of about 15.5% by weight to about 18% by weight, or approximately in the range of about 16% by weight to about 17% by weight, or approximately in the range of about 16.17% by weight to about 16.40% by weight, based on the total weight of the dough.

As discussed above, the dough can include a sweetening agent to enhance the flavor of the dough. The sweetening agent can act as a natural preservative and to provide texture and allow the dough to spread when baked. The sweetening agent can also absorb water, which can help regulate microbial activity in the dough to prolong shelf-life.

Some non-limiting examples of sweetening agents can include sucrose, organic evaporated cane sugar, organic blonde coconut sugar, organic brown sugar, and organic granulated sugar, among others that would be recognized by one having skill in the art in view of the present disclosures. In some exemplary embodiments, an amount of sweetening agent can be used in an amount approximately in the range of about 20% by weight to about 27% by weight, or approximately in the range of about 21% by weight to about 26% by weight, or approximately in the range of about 24% by weight to about 25% by weight, or approximately in the range of about 24.12% by weight to about 24.47% by weight, based on the total weight of the dough.

In some embodiments, the dough can include multiple sweetening agents. In some exemplary embodiments, an amount of organic evaporated cane sugar can be used in an amount approximately in the range of about 7% by weight to about 9% by weight, or approximately in the range of about 7.5% by weight to about 8.5% by weight, or approximately in the range of about 8.23% by weight to about 8.35% by weight. In some exemplary embodiments, an amount of organic blonde coconut sugar can be used in an amount approximately in the range of about 14% by weight to about 18% by weight, or approximately in the range of about 15% by weight to about 17% by weight, or approximately in the range of about 15.89% by weight to about 16.12% by weight. A relative ratio between two such sweetening agents, for example organic evaporated cane sugar and organic blonde coconut sugar, can be approximately in the range of about 1:1.75 to about 1:2, or approximately in the range of about 1:1.8 to about 1:1.95, or at about 1:1.93, though this ratio can vary across embodiments.

The dough can include flavoring and/or texturing ingredients to enhance the taste of the dough. Some non-limited examples of flavoring and texturing ingredients can include vanilla, cranberries, chocolate chips, nut butters, tree nuts, and cacao, among others. A person having skill in the art will understand that the flavoring and texturing ingredients can be added in various amounts to the dough based on the nature of the ingredient and the desired taste of the resultant dough. It will be appreciated that, in view of the present disclosure, the flavoring and/or texturing ingredients can contribute to regulating water activity and pH in the resultant dough composition by absorbing water to lower moisture content.

A person having skill in the art, in view of the present disclosure, will understand that other types of ingredients can be added to the dough without departing from the spirit of the present disclosure. In embodiments in which a particular type of dough is desired (e.g., vegan, plant-based, etc.), the ingredients can adhere to related requirements, but in other instances, many other types of ingredients can be used in place of, and/or in addition to, those described herein. A person skilled in the art will understand that some ingredients can be added or removed to the dough in order for the dough to adhere to specific culinary requirements and/or dietary restrictions while maintaining the properties of the present disclosure. Such modifications are within the scope and spirit of the present disclosure.

Method of Making Dough Composition

A non-limiting method of making the dough composition is disclosed below. A person having skill in the art will appreciate that the steps described below for making the dough composition is merely one example. Except as indicated below and will be readily appreciated by one having ordinary skill in the art, the steps of the described method can be performed in various sequences (unless explicitly stated or indicated otherwise), and one or more steps can be omitted or added. A detailed description of every sequence of steps is omitted herein for the sake of brevity.

In some instances, preferred timing and order of particular steps may be discussed to help to contribute to benefits of the present disclosure. It will be appreciated that while other orders are possible, some may be preferred to provide beneficial results to the dough composition or the method of making thereof, thus providing for improvements in the resulting product that did not exist prior to the present disclosure.

Specific amounts of each ingredient can be measured out prior to their inclusion in the dough composition. Each of the ingredients can be measured out in advance and set aside, or each ingredient can be measured out as it is needed. The ingredients can be measured out using a scale, e.g., a metric scale, though spoons, cups, bowls, and other measuring devices apparent to one skilled in the art. In instances in which ingredients are mixed together, they may be measured together. For example, dry ingredients (e.g., flour, sea salt, baking soda) may be measured together, for instance in a metric scale. As ingredients are measured, they may be placed in containers for use later, such as being placed in one or more bowls. Further, a person skilled in the art will understand that as ingredients are combined, mixed, etc., such steps can be performed in a variety of containers, including but not limited to in various mixing bowls (e.g., stainless steel mixing bowls).

Prior to beginning the method, typical sanitation measures can be undertaken to insure a clean and healthy environment for making the dough. For example, all food contact surfaces in the preparation area(s), kitchen, should be sanitized using procedures known to those skilled in the art before and also typically after the methods prescribed herein are performed. Likewise, all equipment, utensils, and portions of a person's body involved in making the dough should be sanitized using procedures known to those skilled in the art before and also typically after the methods prescribed herein are performed. Such procedures may include, but are not limited to, rinsing, washing, scrubbing, soaping, drying, and otherwise cleaning and sanitizing.

A measured amount of the distilled water can be added to a measured amount of the flaxseed meal to form a dilution, also referred to as a diluted flaxseed and/or diluted fiber-based product. It will be appreciated that the water (e.g., distilled and/or purified water) can be added to the flaxseed meal piecemeal, e.g., a spoonful at a time, or a total content of the water can be added at once. Adding water piecemeal can allow more granular control over the consistency of the dilution and to determine whether an amount of water that should be added to achieve the desired consistency. In some embodiments, piecemeal addition of water to the flaxseed meal can maximize absorption of the water by the flaxseed meal, resulting in a lower water activity and moisture content of the resultant dough composition.

After the water and the flaxseed meal are mixed, the diluted flaxseed can then be set aside to allow the flaxseed meal to rehydrate and/or reconstitute. Rehydrated and/or reconstituted flaxseed meal can decrease moisture content of the dough by absorbing the water and any excess moisture in the remaining ingredients to control microbial activity. The flaxseed meal can be left to soak for about 5 minutes to about 15 minutes, or about 10 minutes to about 15 minutes, or 15 minutes or more. Soaking time can impact the gel consistency of the dilution by absorbing increasing amounts of water, thereby creating a thicker gel. In some embodiments, the thickest gel consistency can be reached between about 10 minutes and about 15 minutes of soaking time, with no discernable change in consistency for soaking times of greater than about 15 minutes. In some embodiments, the diluted flaxseed can be more gel-like after soaking for more than 15 minutes. It will be appreciated that measuring out the flaxseed meal and the water for creating the dilution can usually be the first step of the exemplary method, as the remainder of the ingredients can be measured out while the flaxseed meal soaks, thereby minimizing the time taken to make the dough. Such an order is by no means required though. Once the flaxseed meal has soaked sufficiently in the water of the dilution, the dilution can be incorporated into the dough, as described further herein.

The shortening can be measured out and whipped until it is of a light yellow hue. The shortening can be whipped using a mixer (e.g., an electric mixer), a whisk, a paddle, and/or another device known to those skilled in the art for the purpose of mixing ingredients. The sweetening agent can be added to the shortening. Further, the shortening and the sweetening agent can be creamed to create a shortening-sweetening mixture. A person skilled in the art will understand how to perform the action of "creaming." In some instances, the shortening-sweetening mixture is also referred to as a shortening-sweetening compound and/or a shortening-sugar (where the sweetening agent includes sugar) compound.

The dilution can be added to the shortening-sweetening mixture to form a mixed dilution, sometimes referred to as a diluted flaxseed-shortening-sugar compound, among other terms that can be derived from the various ingredient combinations. The ingredients can be stirred and/or mixed while adding the dilution to the shortening-sweetening mixture to incorporate the dilution into the shortening-sweetening mixture. Incorporating the dilution into the shortening-sweetening mixture prior to adding the flour blend can result in a more consistent mixed dilution and aid in water absorption, though, in some embodiments, the ingredients can be mixed after the dilution has been fully added to the shortening-sweetening mixture to form the mixed dilution. In some embodiments, vanilla (and/or other flavoring agent(s)) can be added to the dilution, the shortening-sugar mixture, and/or to the mixed dilution and incorporated therein. By way of non-limiting example, in some instances vanilla is mixed in approximately at the same time the dilution and the shortening-sugar mixture are combined.

The flour blend can be added to the mixed dilution to form the dough. The flour blend can be added to the mixed dilution while mixing to gradually and thoroughly to incorporate the flour blend into the mixed dilution. In some embodiments, the flour blend can be added piecemeal, e.g., a spoonful at a time, until the flour blend is incorporated, though it will be appreciated that the flour blend can be added to the mixed dilution in bulk. One having skill in the art will appreciate that adding the flour blend piecemeal can decrease the time taken to incorporate the flour blend. Unincorporated flour blend can result in unevenly distributed concentrations of flour throughout the dough, making it appear chunky and/or powdery. The powdery texture can also negatively impacts taste, color, and/or consistency. Mixing the flour blend into the mixed dilution can also maximize water absorption by allowing the flour blend to absorb any excess water to regulate water activity levels.

Additional ingredients, such as baking soda, baking powder, and sea salt, can be mixed into the flour blend prior to adding the flour blend to the mixed dilution, though, in some embodiments, the additional ingredients can be mixed with the mixed dilution prior and/or after the flour blend is added.

The flavoring and/or the texturing ingredients can also be added to the dough. These ingredients can be used in conventional amounts as would be understood by someone having skill in the art. Varying the amount of these ingredients can impact the flavor, texture, and overall consistency of the dough composition. After adding the additional ingredients, the dough can be mixed to ensure that the flavoring and/or the texturing ingredients are distributed throughout the dough as desired.

After the dough is sufficiently mixed, the dough can be added to containers that are then sealed. The containers can be sealed such that air cannot penetrate the container so as to minimize the potential for microbial activity in the dough. The finished dough can then be held at refrigerated, non-refrigerated, and/or ambient temperatures for distribution or sale. It will be appreciated that for food storage, such as for the dough provided for herein, temperatures approximately in the range of about 37 degrees F. to about 77 degrees F. are appropriate, with refrigerated conditions typically being approximately in the range of about 37 degrees F. to about 41 degrees F., and ambient temperatures typically being approximately in the range of about 68 degrees F. to about 77 degrees F. In some embodiments, the containers can be packaged and/or stored at temperatures approximately in the range of about 37 degrees F. to about 77 degrees F., or approximately in the range of about 50 degrees F. to about 77 degrees F., or approximately in the range of about 53 degrees F. to about 68 degrees F., or approximately in the range of about 59 degrees F. to about 64 degrees F., or approximately in the range of about 61 degrees F. to about 63 degrees F. A person skilled in the art will recognize that these temperature ranges include ranges that allow the containers to be stored in a shelf-stable environment, which is to say the containers, and the dough contained there, does not have to be refrigerated or otherwise managed by typical temperature controls used to store many existing doughs (e.g., cookie doughs) for an extended period of time (e.g., at least about 30 days, at least about 60 days, at least about 70 days, at least about 74 days). It will be appreciated that this time frame for the shelf-life of the dough can be extended if refrigeration and/or if preservation methods, e.g., potassium sorbate and/or sodium benzoate, are implemented. Likewise, a person skilled in the art, in view of the present disclosures, will recognize that other factors can affect the shelf-life of the dough, including but not limited to the type and size of the packaging, and the amount of air disposed within the packaging with the dough, among other factors.

In some instances, prior to putting the dough into containers that are to be sealed, the dough can be removed from the mixing bowl(s) and placed on Certo Food Service film that has been placed over flat sheet trays disposed atop a working table, e.g., a stainless steel working table or another type of working table or counter provided for herein or otherwise known to those skilled in the art. A desired amount of dough, e.g., 16 ounces or 32 ounces, can be removed via a gloved hand or a utensil, such as a spoon or an ice-cream scoop, and placed into a container. The container can rest on a zeroed scale to make an accurate measurement by weight of the product before the container is sealed. In some embodiments, the containers can be 16-ounce or 32-ounce clear, polypropylene, deli-type service containers that are produced to be both FDA and USDA compliant and certified Food Safe. The containers can be sealed with a tamper evident safe lock cover. The sealed containers can be placed in a storage refrigerator at approximately 40 degrees F., though it will be appreciated that, in view of the present disclosure, control of the temperature of the dough is not essential for at least about 30 days, for at least about 60 days, for at least about 70 days and/or at least about 74 days. It will be appreciated that eliminating and/or minimizing an amount of air sealed within the container during packaging can contribute to longer time periods during which control of the temperature of the dough is not essential due to the decrease in the potential for microbial activity in the dough. For example, testing related to the dough provided for herein in which the dough was stored in a smaller container, e.g., a 16-ounce container, yielded a longer time period during there was no significant microbial activity than when a 32-ounce container was used that included more air in it than the 16-ounce container. A person skilled in the art, in view of the present disclosures, will recognize that shelf-stability beyond at least about 74 days is also possible, particularly if different packaging techniques that minimize or eliminate air disposed within the packaging are utilized. Non-limiting examples of such packaging includes but is not limited to chub packaging, reduced oxygen packaging, and vacuum seal packaging—two types of packaging known to those skilled in the art. In instances in which air is further eliminated from packaging by using techniques like chub, reduced oxygen, or vacuum seal packaging, control of the temperature of the dough may not be essential for at least about 80 days, for at least about 90 days, for at least about 100 days, for at least about 100 days, and/or at least about 120 days. It is possible shelf-stability may last even longer than about 120 days, although a user should be mindful that the dough may begin to dry-out after a certain period of time, in which case the dough may not be as easy to work with or use—but it could still be devoid of any significant microbial activity.

Alternatively, in some instances, rather than packaging the dough, the dough can be removed from the mixing bowl(s) and placed on Certo Food Service film that has been placed over flat sheet trays. By way of example, the dough can be formed into approximately 11"×approximately 9"×approximately 2" thick individual "blocks" that can be wrapped tightly within Certo Food Service film. Many other sizes of the "blocks" can be possible, and thus approximately 11"×approximately 9"×approximately 2" is by no means a limiting dimension; it merely is one of many examples of sizes of "blocks." The "blocks" can be placed in a storage refrigerator at approximately 40 degrees F., though it will be appreciated that, in view of the present disclosure, control of the temperature of the dough is not essential for at least about 30 days, for at least about 60 days, for at least about 70 days, and/or at least about 74 days.

In some instances, after formation of the dough "blocks," cookies can be formulated from the "blocks." In some embodiments, the dough can be made into cookies after the dough has been made but before it is packaged, or it can be made into cookies after it has been packaged and subsequently opened for use.

In one, non-limiting instance of the way the dough can be baked, the dough can be scooped into "balls," which can be weighed on a sanitized food scale with the scale plate covered with parchment paper. For example, when using an approximately 11"×approximately 9"×approximately 2" block, each "ball" can weigh approximately in the range of about 20 grams to about 25 grams, with each "ball" being placed on a parchment covered baking pan or sheet. The pans or sheets can be of any size and made of various materials that are produced for baking, but in some embodiments they can be 22"×16" aluminum sheet pans, each allowing approximately 24 "balls" per pan. The "balls" can be pressed into flat cookie shapes using parchment paper placed between the dough and a flattening device. In some embodiments, one or more of the "balls" can be formed into any number of shapes, such as by a cookie cutter.

Once the "balls" are positioned on the pan and are ready for baking, the pan can be placed within a convection oven set at approximately 375 degrees F. and baked for a time approximately in the range of about 10 minutes to about 12 minutes, or, alternatively, placed within a standard gas-fired oven set at approximately 350 degrees F. for a time approximately in the range of about 8 minutes to about 10 minutes. A person skilled in the art will understand how the temperatures and time periods may vary depending on the properties of the oven or other cooking instrument used to bake the dough. After baking is completed, the pan can be removed from the oven and the resulting cookies be allowed to cool. For example, the sheet pan can be set within a stainless steel cooling rack for a period of approximately 60 minutes. It will be appreciated that shorter or longer times can be used to cool the cookies, the cookies can be taken off the sheet pan to cool, and/or other changes can be made to allow the cookies to cool in a desired manner, as will be understood by a person skilled in the art. The cookies can be eaten and/or stored using techniques known to one skilled in the art for properly storing cookies to prevent contamination and/or spoliation.

A person skilled in the art will recognize many other ways by which the dough can be treated after it has been formed between the time the dough is made and the time the dough is packaged without departing from the spirit of the present disclosure. Likewise, a person skilled in the art will recognize may other ways by which the dough can be packaged for eventual use (sale, distribution, baking, etc.) without departing from the spirit of the present disclosure.

The dough compositions of the present disclosure can be further illustrated by the following examples in which all parts, proportions, and percentages are by weight based on the total weight of the dough unless otherwise indicated. One having ordinary skill in the art will appreciate that the amounts, proportions, and percentages of the ingredients described below are merely exemplary of a single method of preparing the dough. Each ingredient presented below is described in terms of an approximate weight and approximate percentage of product used to make a dough of the present disclosure. The ingredients are non-limiting examples of ingredients. The entirety of the disclosure, as well as the knowledge of those skilled in the art in view of the present disclosure, should be relied upon to understand other ingredients, substitutes, etc. that can be used while still maintaining the benefits of the present disclosure (i.e., shelf-stability).

Example 1

A non-limiting example of the ingredients and their relative amounts used to make a cranberry and chocolate chip dough are:

| Ingredient | Approximate weight (grams) | Approximate % of Product |
|---|---|---|
| Gluten Free Flour Mix (flour blend) | 228 | 32.81% |
| Baking Soda | 5 | 0.72% |
| Organic Sea Salt | 3 | 0.43% |
| Organic Flaxseed Meal | 7 | 1.01% |
| Distilled Water | 60 | 8.63% |
| Organic Shortening | 114 | 16.40% |
| Organic Evaporated Cane Sugar (sweetening agent) | 58 | 8.35% |
| Organic Blonde Coconut Sugar (sweetening agent) | 112 | 16.12% |
| Organic Mexican Vanilla | 4 | 0.58% |
| Extra Dark Chocolate Chips | 52 | 7.48% |
| Organic Dried Cranberries | 52 | 7.48% |
| Total | 695 | 100.000% |

The organic flaxseed meal and the distilled water can be mixed together to produce a dilution and the dilution can be set aside to soak. The organic shortening can be whipped and mixed with the organic evaporated cane sugar and the organic blonde coconut sugar to produce a cream having a consistency similar to that of whipped cream. The dilution can be added to the creamy mixture and mixed along with the vanilla to incorporate the ingredients into the cream and form a mixed dilution. The flour blend can be added to the mixed dilution while mixing to incorporate the flour blend and produce the dough composition. The chocolate chips and the cranberries can be added to the dough and mixed thoroughly to uniformly distribute them throughout, or to distribute them in any desired consistency throughout the dough. The dough can then be packaged and stored for distribution and/or sale.

Example 2

A non-limiting example of the ingredients and their relative amounts used to make a chocolate chip dough are:

| Ingredient | Approximate weight (grams) | Approximate % of Product |
|---|---|---|
| Gluten Free Flour Mix (flour blend) | 228 | 32.34% |
| Baking Soda | 5 | 0.71% |
| Organic Sea Salt | 3 | 0.43% |
| Organic Flaxseed Meal | 7 | 0.99% |
| Distilled Water | 60 | 8.51% |
| Organic Shortening | 114 | 16.17% |
| Organic Evaporated Cane Sugar (sweetening agent) | 58 | 8.23% |
| Organic Blonde Coconut Sugar (sweetening agent) | 112 | 15.89% |
| Organic Mexican Vanilla | 4 | 0.57% |
| Extra Dark Chocolate Chips | 114 | 16.17% |
| Total | 705 | 100.000% |

-continued

| Ingredient | Approximate weight (grams) | Approximate % of Product |
|---|---|---|

The organic flaxseed meal and the distilled water can be mixed together to produce a dilution and the dilution can be set aside to soak. The organic shortening can be whipped and then mixed with the organic evaporated cane sugar and the organic blonde coconut sugar to produce a cream having a consistency similar to that of whipped cream. The dilution can be added to the creamy mixture and mixed along with the vanilla to incorporate the ingredients into the cream to form a mixed dilution. The flour blend can be added to the mixed dilution while mixing to incorporate the flour blend and produce the dough composition. The chocolate chips can be added to the dough and mixed thoroughly to uniformly distribute them throughout, or to distribute them in any desired consistency throughout the dough. The dough can then be packaged and/or stored for distribution and/or sale.

The dough in both Example 1 and Example 2 were analyzed post-production over 74 days stored at an ambient temperature (approximately in the range of about 68 degrees F. to about 77 degrees F.) by Alliant Food Safety Labs, LLC of Farmington, Conn. During that time period, the pH for the dough in Example 1 was found to range approximately between about 7.14 and about 7.61, and the water activity was found to range approximately between about 0.785 and about 0.788, and the pH for the dough in Example 2 was found to range approximately between about 7.23 and about 8.06, and the water activity was found to range approximately between about 0.810 and about 0.812. Storage of the dough at ambient temperature did not exhibit significant change in water activity. During testing, water was found to be tied up by the dough due to absorption by the flaxseed meal during rehydration and/or reconstitution. The water can also be bound to the ingredients through the addition of sea salt, sweetening agents, and the additional ingredients added during processing through whipping and mixing. The dough was found to have a uniform consistency with added particulate from the stable chocolate chips and/or cranberries. The dough was also found to be stable for at least 30 days, for at least 60 days, for at least 70 days, and for at least 74 days without significant microbial activity, also referred to as the dough being of "high quality regarding microbial activity." That is, through 74 days, the testing yielded cookie dough that maintained a clean flavor and aroma with the texture and overall presentation typical of fresh raw cookie dough. The doughs exhibited very low growth of potential spoilage organisms. At approximately 74 days, the dough texture was starting to dry, but the overall product condition was still considered acceptable by the testing agency. Based on these findings, the dough can be shipped at refrigerated, non-refrigerated, or ambient temperatures and does not require time or temperature control for food safety for at least 30 days, for at least 60 days, for at least 70 days, and for at least 74 days.

Prior to testing the dough in Examples 1 and 2, Alliant Food Safety Labs, in conjunction with the Institute of Food Technologists (ITF), prepared and submitted a report to determine if dough formulated using the techniques and certain amounts of the ingredients that are covered in the present disclosure result in a dough that is shelf-stable. The dough was similar to those of Examples 1 and 2. The ITF Science and Technology Expert Panel reviewed two protocols used by NSF International and the American Baking Association for determining if a food is a time/temperature control for safety (TCS) food. It makes this analysis by examining factors such as aw, pH, redox potential, natural and added antimicrobials and competitive microorganisms, and extrinsic factors such as packaging, atmospheres, storage conditions, processing steps, and new preservation technologies that influence microbial growth.

The current Food Code (2013), Chapter 3 Food, references Annex 3—Public Health Reasons/Administrative Guidelines section 1-201.10(B), which details the definition of "Time/Temperature Control for Food safety." Questions investigated when determining if a food requires time and temperature control for safety (TCS) includes:

Is the intent to hold the food without using time or temperature control?

Is the food raw, or is the food heat-treated?

Does the food already require time/temperature control for safety by the definition in paragraph 1-201.10(B) identified above?

Does a product history with sound scientific rationale exist indicating a safe history of use?

Is the food processed and packaged so that it no longer requires TCS such as ultra-high temperature (UHT) creamers or shelf-stable canned goods?

What is the pH and aw of the food in question using an independent laboratory and Association of Official Analytical Chemists (AOAC) methods of analysis?

Tables contained within section 1-201.10(B) related to the interaction of pH and aw are used to determine whether the food can be designated TCS, and the tables, and related guidelines and regulations from the Food Code, are incorporated by reference herein in their entirety.

In the initial report related to cookie doughs similar to those of Examples 1 and 2, it was determined that the cookie doughs do not require time or temperature control food for safety based on a 30-day test. The test only lasted 30 days, and thus are not evidence of an upper bound on the shelf-stability of the doughs. More particularly, the value of the pH after three days for the cranberry and chocolate chip dough was about 7.14 and the value of the pH for that same dough after thirty days was about 7.61, while the water activity after three days for that same dough was about 7.61 and the water activity after thirty days for that same dough was about 0.785. Meanwhile, the value of the pH after three days for the chocolate chip dough was about 7.23 and the value of the pH for that same dough after thirty days was about 8.06, while the water activity after three days for that same dough was about 0.810 and the water activity after thirty days for that same dough was about 0.812. The report determined that the dough mixtures effectively tie up the minimal addition of distilled water used to rehydrate the flaxseed meal during the mixing process and products stored at ambient temperatures over 30 days did not exhibit any significant change in water activity. The report notes that the ingredients used in the dough were all previously processed or provided in shelf-stable formats and only distilled water was used, and the products did not undergo heat treatment or any alternative treatments after further processing occurred. The results from the doughs were evaluated using Table B of the aforementioned guidelines and regulations from the Food Code, and thus they were categorized as non-TCS food based on the measured pH and water activity levels, meaning neither dough requires time/temperature controls for food safety.

Notably, the FDA Food Code and IFT Review of Potentially Hazardous Food definitions identify less than 0.88 water activity to allow for safe storage without temperature control. Further, a water activity of 0.85 or below is considered to prevent the growth and toxin production of all pathogenic bacteria, including *S. aureus* and *C. botulinum*, and may be considered critical for the safety of a shelf-stable product based on water activity. The company that performed the testing of the present doughs, Alliant Food Safety Labs, suggest setting any water activity based critical control point to 0.85 for the types of products that were evaluated. For the 30-day analysis, Alliant Food Safety Labs indicated a two-week shelf life can safely be expected in ambient storage temperatures, and for the 74-day analysis, Alliant Food Safety Labs indicated a 60-day shelf life can safely be expected in ambient storage temperatures. These lower amounts appear to be used a low threshold, since the testing yielded safe conditions for 30 and 74 days, respectively.

The illustrated and described composition and methods are in no way limiting. A person skilled in the art, in view of the present disclosure, will understand how to apply the teachings of one embodiment to other embodiments either explicitly or implicitly provided for in the present disclosure. Further, a person skilled in the art will appreciate further features and advantages of the present disclosure based on the above-described embodiments. Accordingly, the disclosure is not to be limited by what has been particularly described, except as indicated by the appended claims. All publications and references cited herein are expressly incorporated herein by reference in their entirety.

What is claimed is:

1. A method of preparing a shelf-stable dough, the method comprising:

combining from about 0.5% by weight to about 1.5% by weight of a flaxseed meal with about 4% by weight to about 9% by weight of purified water;

allowing the flaxseed meal to reconstitute with the purified water for between about 5 minutes to about 15 minutes to form diluted flaxseed;

combining from about 7% by weight to about 9% by weight of cane sugar, from about 14% by weight to about 18% by weight of coconut sugar, and from about 15% by weight to about 20% by weight of shortening to form a shortening-sugar compound;

mixing the diluted flaxseed and the shortening-sugar compound to form a diluted flaxseed-shortening-sugar compound; and adding from about 30% by weight to about 35% by weight of a flour blend to the diluted flaxseed-shortening-sugar compound to form a shelf-stable dough, the flour blend being prepared by mixing from about 55% by weight to about 60% by weight of white rice flour relative to the weight of the flour blend, and from about 20% by weight to about 25% by weight of tapioca flour relative to the weight of the flour blend, with from about 18% by weight to about 22% by weight of potato starch relative to the weight of the flour blend, wherein all of said percentages are based on the total weight of the dough, wherein the dough is plant-based, vegan, and gluten-free, and wherein the dough has a water activity of less than or equal to about 0.85.

2. The method of claim 1, wherein the flour blend further comprises from about 0.8% by weight to about 1.4% by weight of xanthan gum relative to the weight of the flour blend.

3. The method of claim 1, wherein the flour blend is added to the diluted flaxseed during mixing of the diluted flaxseed with the shortening-sugar compound to form the diluted flaxseed-shortening-sugar compound.

4. The method of claim 1, wherein combining from about 7% by weight to about 9% by weight of cane sugar, from about 14% by weight to about 18% by weight of coconut sugar, and about 15% by weight to about 20% by weight of shortening to form a shortening-sugar compound further comprises creaming from about 7% by weight to about 9% by weight of cane sugar, from about 14% by weight to about 18% by weight of coconut sugar, and about 15% by weight to about 20% by weight of shortening to form the shortening-sugar compound.

5. The method of claim 1, further comprising:
depositing the dough into a packing container; and
sealing the container such that the container is substantially devoid of air.

6. The method of claim 1, wherein allowing the flaxseed meal to reconstitute with the purified water for between about 5 minutes to about 15 minutes further comprises allowing the flaxseed meal to reconstitute with the purified water for about 10 minutes to about 15 minutes.

7. The method of claim 1, wherein mixing the diluted flaxseed and the shortening-sugar compound occurs approximately in the range of about 10 minutes to about 15 minutes after the flaxseed meal has been reconstituted with the purified water for between about 5 minutes to about 15 minutes to form diluted flaxseed.

8. The method of claim 1, wherein each of the flaxseed meal, the cane sugar, the coconut sugar, the shortening, and the flour blend is all-natural and organic.

9. The method of claim 1, wherein the dough has a water activity of less than or equal to about 0.83 at ambient temperature for at least about 30 days.

10. The method of claim 9, wherein the dough has a water activity of less than or equal to about 0.83 at ambient temperature for at least about 60 days.

11. A shelf-stable dough, comprising:
from about 30% by weight to about 35% by weight of a flour mix, the flour mix comprising from about 55% by weight to about 60% by weight of white rice flour relative to the total weight of the flour mix, from about 20% by weight to about 25% by weight of tapioca flour relative to the total weight of the flour mix, and from about 18% by weight to about 22% by weight of potato starch relative to the total weight of the flour mix;
from about 0.5% by weight to about 1.5% by weight of a flaxseed meal;
from about 4% by weight to about 9% by weight of distilled water; and
from about 21% to about 27% by weight of sugar,
wherein the dough is plant-based, vegan, and gluten-free,
wherein all of said percentages are based on the total weight of the dough, and
wherein a water activity of the dough is less than or equal to about 0.85.

12. The dough of claim 11, wherein the flour mix further comprises xanthan gum.

13. The dough of claim 11, wherein the flour mix further comprises a shortening approximately in the range of about 15% by weight to about 20% by weight.

14. The dough of claim 13, wherein the shortening comprises one or more of a coconut oil and a palm oil.

15. The dough of claim 11, wherein a ratio of the flaxseed meal to the distilled water is approximately in the range of about 1 tablespoon of flaxseed meal to about 2½ tablespoons of distilled water to about 1 tablespoon of flaxseed meal to about 3½ tablespoons of distilled water.

16. The dough of claim 11, wherein the flaxseed meal and the distilled water used in the dough were mixed and undisturbed for about 5 minutes to about 15 minutes for flaxseed rehydration.

17. The dough of claim 11, wherein the dough has a water activity of less than or equal to about 0.83 at ambient temperature for at least about 30 days.

18. The dough of claim 17, wherein the dough has a water activity of less than or equal to about 0.83 at ambient temperature for at least about 60 days.

19. A method of preparing a shelf-stable dough, the method comprising:
combining from about 0.5% by weight to about 1.5% by weight of a flaxseed meal with about 4% by weight to about 9% by weight of purified water;
allowing the flaxseed meal to reconstitute with the purified water for between about 5 minutes to about 15 minutes to form diluted flaxseed;
combining from about 7% by weight to about 9% by weight of cane sugar, from about 14% by weight to about 18% by weight of coconut sugar, and from about 15% by weight to about 20% by weight of shortening to form a shortening-sugar compound,
mixing the diluted flaxseed and the shortening-sugar compound to form a diluted flaxseed-shortening-sugar compound; and
adding from about 30% by weight to about 35% by weight of a flour blend to the diluted flaxseed-shortening-sugar compound to form a shelf-stable dough, the flour blend being prepared by mixing from about 55% by weight to about 60% by weight of white rice flour relative to the weight of the flour blend, and from about 20% by weight to about 25% by weight of tapioca flour relative to the weight of the flour blend, with from about 18% by weight to about 22% by weight of potato starch relative to the weight of the flour blend,
wherein all of said percentages are based on the total weight of the dough,
wherein the dough is gluten-free, and
wherein the dough has a water activity in a range from about 0.785 to about 0.85.

20. The method of claim 19, wherein the flour blend further comprises from about 0.8% by weight to about 1.4% by weight of xanthan gum relative to the weight of the flour blend.

21. The method of claim 19, wherein the flour blend is added to the diluted flaxseed during mixing of the diluted flaxseed with the shortening-sugar compound to form the diluted flaxseed-shortening-sugar compound.

22. The method of claim 19, wherein mixing the diluted flaxseed and the shortening-sugar compound occurs approximately in the range of about 10 minutes to about 15 minutes after the flaxseed meal has been reconstituted with the purified water for between about 5 minutes to about 15 minutes to form diluted flaxseed.

23. A method of preparing a plant-based, vegan, and gluten-free shelf-stable dough, the method comprising:
combining from about 0.5% by weight to about 1.5% by weight of a flaxseed meal with about 4% by weight to about 9% by weight of purified water;
allowing the flaxseed meal to reconstitute with the purified water for between about 5 minutes to about 15 minutes to form diluted flaxseed; and
adding from about 30% by weight to about 35% by weight of a flour blend to the diluted flaxseed, the flour blend being prepared by mixing from about 55% by weight to about 60% by weight of white rice flour relative to the weight of the flour blend, and from about 20% by weight to about 25% by weight of tapioca flour relative to the weight of the flour blend, with from about 18% by weight to about 22% by weight of potato starch relative to the weight of the flour blend;

wherein all of said percentages are based on the total weight of the dough, and wherein the dough has a water activity of less than or equal to about 0.85.

24. The method of claim 23, wherein the flour blend further comprises from about 0.8% by weight to about 1.4% by weight of xanthan gum relative to the weight of the flour blend.

25. The method of claim 23, further comprising combining from about 7% by weight to about 9% by weight of cane sugar, from about 14% by weight to about 18% by weight of coconut sugar, and from about 15% by weight to about 20% by weight of shortening to form a shortening-sugar compound and mixing the diluted flaxseed and the shortening-sugar compound to form a diluted flaxseed-shortening-sugar compound.

26. The method of claim 25, wherein the flour blend is added to the diluted flaxseed during mixing of the diluted flaxseed with the shortening-sugar compound to form the diluted flaxseed-shortening-sugar compound.

27. The method of claim 26, wherein mixing the diluted flaxseed and the shortening-sugar compound occurs approximately in the range of about 10 minutes to about 15 minutes after the flaxseed meal has been reconstituted with the purified water for between about 5 minutes to about 15 minutes to form diluted flaxseed.

28. The method of claim 1, wherein the dough has a water activity in a range from about 0.785 to about 0.85.

29. The dough of claim 19, wherein a water activity of the dough is in a range from about 0.785 to about 0.85.

30. The dough of claim 11, wherein the dough is all-natural and organic.

31. The method of claim 19, wherein the dough is plant-based, vegan, all-natural, and organic.

32. The method of claim 23, wherein the dough is all-natural and organic.

33. The method of claim 23, wherein the dough has a water activity in a range from about 0.785 to about 0.85.

* * * * *